Patented Dec. 15, 1931

1,836,487

UNITED STATES PATENT OFFICE

FERDINAND MÜNZ, OF FRANKFORT-ON-THE-MAIN-MAINKUR, GERMANY, ASSIGNOR TO GENERAL ANILINE WORKS, INC., OF NEW YORK, N. Y., A CORPORATION OF DELAWARE

IMPROVED PROCESS FOR THE PRODUCTION OF ACID AND LIME RESISTING DERIVATIVES OF UNSATURATED FATTY ACIDS

No Drawing. Application filed August 30, 1928, Serial No. 303,120, and in Germany September 10, 1927.

The present invention relates to a process for the preparation of acid and lime resisting derivatives of unsaturated fatty acids. More particularly it relates to a sulfonation process which is carried out in the presence of a halogenated derivative of ethylene by means of fuming sulfuric acid.

In my U. S. application Serial No. 88,460, filed February 15th, 1926, there is described a process for the production of new derivatives of unsaturated fatty acids resistant to acids and not precipitated by calcareous water, which process consists in acting with sulfuric anhydride, advantageously in form of fuming sulfuric acid, on unsaturated fatty acid compounds. In the specification the addition of an organic diluent such as carbon tetrachloride is mentioned as a suitable step for carrying out the process practically.

Now I have found that it is an especial advantage to carry out this process of sulfonation in the presence of a halogenated derivative of ethylene, such as trichloroethylene of the formula $CHCl=CCl_2$ or dichlorethylene of the formula $CHCl=CHCl$. By working in this manner it is possible to have a homogeneous reaction mass of less viscosity which therefore can easily be stirred uniformly, which is of importance in order to avoid local overheating of the sulfonation mass and a partial destruction of the starting material derived therefrom. In consequence thereof the end products obtained by my improved process are distinguished by their higher degree of purity and a particularly light color.

In order to further illustrate my invention the following examples are given, the parts being by weight and all temperatures in centigrade degrees; but I wish it to be understood that my invention is not limited to the examples given, nor to the exact conditions stated therein.

Example 1

100 parts of oleic acid are mixed with about 125 parts of trichloroethylene and at about 0–5° about 250 parts of fuming sulfuric acid of 27% $SO_3$ are gradually allowed to run in during a period of from 10 to 12 hours. When the reaction is finished, the reaction mass is diluted with about double the quantity of ice. The reaction mass is repeatedly washed out with a common salt solution and the layer containing the sulfo-fatty acid derivative is separated from the salt solution by a separating apparatus. Then the reaction product is neutralized and the trichloroethylene is removed by distillation.

The sulfonation product thus obtained represents a light yellow oil distinguished by a particular degree of purity, forming in concentrated aqueous solutions a viscous liquor which is resistant towards acids and is not precipitated by calcareous water.

Example 2

100 parts of castor oil are mixed with about 125 parts of trichloroethylene and at about 0–5° 200 parts of fuming sulfuric acid of about 27% $SO_3$ are allowed to run in. When the reaction is finished, the mass is worked up as described in Example 1. The sulfonation product thus obtained is distinguished by a great purity and a remarkable resistance towards acids and lime.

As stated in my application Serial No. 88,460 cited above by the action of fuming sulfuric acid on unsaturated hydroxy fatty acid compounds (more than one and according to the scheme of equations given therein two molecules of sulfuric anhydride are to be used in proportion to 1 molecule of a fatty acid compound) the usual formation of a sulfuric acid ether as well as the introduction of a new sulfonic acid group bound directly to a carbon atom into the fatty acid molecule takes place. It is therefore possible to produce in a first phase of reaction the sulfuric acid ethers by the action of concentrated sulfuric or chlorosulfonic acid, hitherto used therefor, with or without the addition of a halogenated derivative of ethylene, and to treat these primary reaction products without isolating them with fuming sulfuric acid in the presence of a halogenated derivative of ethylene according to my present process. In this case one may proceed as follows:

Example 3

100 parts of castor oil are sulfonated at about 30-40° with 30 parts of sulfuric acid monohydrate and then 100 parts of trichloroethylene and 200 parts of fuming sulfuric acid of about 25% SO₃ are added to the mixture. When the reaction is finished, the mass is worked up as described above. The reaction product thus obtained is practically identical with that of Example 2.

*Example 4*

100 parts of castor oil are mixed with 80-90 parts of trichloroethylene and to the mixture at about 25-30° 35 parts of chlorosulfonic acid are added. Then the mass is cooled down to about 10° and at a temperature of about 10-15° 60 parts of fuming sulfuric acid of about 64% SO₃ are gradually introduced during about 10 to 12 hours. When the reaction is finished, the reaction mass is diluted with about 200 parts of ice and neutralized with a caustic soda solution until a feeble acid reaction is obtained. The reaction mass is repeatedly washed with a saturated common salt solution, the layer containing the sulfo-fatty acid is separated from the salt solution by a separating apparatus, and the trichloroethylene is removed by distillation.

The product thus obtained is practically identical with the product of Example 2.

*Example 5*

100 parts of oleic acid are dissolved in about 150 parts of symmetrical dichloroethylene and while strongly cooling, 200 parts of fuming sulfuric acid containing 25% SO₃ are gradually added during a period of about 10 to 12 hours. When the reaction is finished, the reaction mass is poured on ice water, whereby after a short time separation into two layers occurs. The lower layer containing dichloroethylene and a small quantity of unsulfonated oleic acid is applied for the recovery of the solvent, the upper layer is poured on an excess of milk of lime. The calcium salt of the sulfo-oleic acid thus formed is then converted in the known manner into the sodium salt and the solution thus obtained is evaporated to about 200 parts of weight. The product thus formed represents a brown solution of an excellent resistance towards acids, lime and salts.

I claim:

1. A process which comprises acting with fuming sulfuric acid on an unsaturated fatty acid compound in the presence of a halogenated derivative of ethylene.

2. A process which comprises acting with fuming sulfuric acid on an unsaturated hydroxyfatty acid compound in the presence of a halogenated derivative of ethylene.

3. A process which comprises acting with fuming sulfuric acid on an unsaturated hydroxyfatty acid compound in the presence of a halogenated derivative of ethylene, more than 1 molecule of sulfuric anhydride being used in proportion to 1 molecule of said fatty acid compound.

4. A process which comprises acting with two molecular proportions of sulfuric anhydride in form of fuming sulfuric acid on one molecular proportion of an unsaturated hydroxy fatty acid compound in the presence of a halogenated derivative of ethylene.

5. A process which comprises acting with fuming sulfuric acid on castor oil in the presence of trichloroethylene, more than one molecular equivalent of sulfuric anhydride being used in proportion to 1 molecular equivalent of castor oil or ricinoleic acid.

6. A process which comprises acting with fuming sulfuric acid on an unsaturated hydroxy fatty acid compound in the presence of trichloroethylene.

In testimony whereof, I affix my signature.

FERDINAND MÜNZ.